U S 0 0 6 5 3 8 1 9 3 B 1

US006538193B1

(12) United States Patent
Fraas

(10) Patent No.: US 6,538,193 B1
(45) Date of Patent: Mar. 25, 2003

(54) THERMOPHOTOVOLTAIC GENERATOR IN HIGH TEMPERATURE INDUSTRIAL PROCESS

(75) Inventor: Lewis M. Fraas, Issaquah, WA (US)

(73) Assignee: JX Crystals Inc., Issaquah, WA (US)

( * ) Notice: Subject to any disclaimer, the term of this patent is extended or adjusted under 35 U.S.C. 154(b) by 105 days.

(21) Appl. No.: 09/678,839

(22) Filed: Oct. 4, 2000

Related U.S. Application Data

(60) Provisional application No. 60/198,734, filed on Apr. 21, 2000.

(51) Int. Cl.[7] .............................................. H01L 31/058
(52) U.S. Cl. ........................ 136/253; 136/291; 65/335; 65/375
(58) Field of Search ............................... 136/253, 291; 65/335, 375

(56) References Cited

U.S. PATENT DOCUMENTS

| 3,433,676 A | 3/1969 | Stein |
| 3,751,303 A | 8/1973 | Kittl |
| 4,045,246 A | 8/1977 | Mlavsky et al. |
| 4,069,812 A | 1/1978 | O'Neill |
| 4,131,485 A | 12/1978 | Meinel et al. |
| 4,180,414 A | 12/1979 | Diamond et al. |
| 4,234,352 A | 11/1980 | Swanson |
| 4,331,829 A | 5/1982 | Palazzetti et al. |
| 4,707,560 A | 11/1987 | Hottel et al. |
| 4,746,370 A | 5/1988 | Woolf |
| 4,776,895 A | 10/1988 | Goldstein |
| 4,975,563 A | * 12/1990 | Roebuck et al. ............ 219/544 |
| 5,001,327 A | * 3/1991 | Hirasawa et al. ........... 219/390 |
| 5,091,018 A | 2/1992 | Fraas et al. |
| 5,096,505 A | 3/1992 | Fraas et al. |
| 5,118,361 A | 6/1992 | Fraas et al. |
| 5,123,968 A | 6/1992 | Fraas et al. |
| 5,217,539 A | 6/1993 | Fraas et al. |
| 5,248,346 A | 9/1993 | Fraas et al. |
| 5,255,666 A | 10/1993 | Curchod |
| 5,312,521 A | 5/1994 | Fraas et al. |
| 5,356,487 A | 10/1994 | Goldstein et al. |
| 5,383,976 A | 1/1995 | Fraas et al. |
| 5,389,158 A | 2/1995 | Fraas et al. |
| 5,401,329 A | 3/1995 | Fraas et al. |
| 5,403,405 A | 4/1995 | Fraas et al. |
| 5,439,532 A | 8/1995 | Fraas |
| 5,505,789 A | 4/1996 | Fraas et al. |
| 5,512,109 A | 4/1996 | Fraas et al. |
| 5,551,992 A | 9/1996 | Fraas |
| 5,560,783 A | 10/1996 | Hamlen |
| 5,616,186 A | 4/1997 | Fraas et al. |
| 5,651,838 A | 7/1997 | Fraas et al. |
| 5,865,906 A | 2/1999 | Ferguson et al. |

(List continued on next page.)

OTHER PUBLICATIONS

Yamaguchi et al, "Thermophotovoltaic Potential Applications for Civilian and Industrial Use in Japan," Thermophotvoltaic Generation of Electricity, Fourth NREL Conference, The American Institute of Physics, 1999, pp. 17–29.*

(List continued on next page.)

Primary Examiner—Alan Diamond
(74) Attorney, Agent, or Firm—James Creighton Wray; Meera P. Narasimhan

(57) ABSTRACT

An emitter for use with a generator has a tube closed at one end, heated from its outside with a water-cooled photovoltaic converter array mounted inside for glass-melting application. Several TPV tubes may be inserted through holes in the insulation into the port sections between the glass-melting furnace and the regenerators. Any one of these tubes may be removed for maintenance at any time and replaced with a closure to close off the hole, without affecting the industrial process. The emitter tube may be a SiC or KANTHAL tube. The tube may be lines on its inside with AR coated tungsten foil or the tungsten may be deposited on the inner tube surface as a film followed by the AR coating. The photovoltaic converter array may comprise a polygonal array of shingle circuits where the circuits are fabricated using low bandgap GaSb cells.

60 Claims, 2 Drawing Sheets

U.S. PATENT DOCUMENTS

| | | | | |
|---|---|---|---|---|
| 6,232,545 | B1 * | 5/2001 | Samaras et al. | 136/253 |
| 6,423,896 | B1 * | 7/2002 | Keegan | 136/253 |
| 2002/0084121 | A1 * | 7/2002 | Hulen | 180/65.3 |
| 2002/0139409 | A1 * | 10/2002 | Paramonov et al. | 136/205 |

OTHER PUBLICATIONS

Erickson et al, "Design and Construction of a Thermophotovoltaic Generator Using Turbine Combustion Gas," IECE Proceedings of the 32nd Intersociety Energy Conversion Engineering Conference, vol. 2, pp. 1101–1106, (1997).*

Good et al, "A Comparison of Planar and Cylindrical Thermophotovoltaic Energy Conversion Systems," IECE Proceedings of the 32nd Intersociety Energy Conversion Engineering Conference, vol. 2 pp. 1113–1118, (1997).*

Höfler et al.; *Selective Emitters for Thermophotovoltaic Solar Energy Conversion*; Solar Cells 1983; 10: p. 257–271.

Höfler et al.; *Interference Filters for Thermophotovoltaic Solar Energy Conversion*; Solar Cells 1983; 10: pp. 273–286.

Höfler et al.; *Selective Absorbers and Interference Filters for Thermophotovoltaic Energy Conversion*; Proceedings of 5th Photovoltaic Solar Energy Conf., Athens, Greece(Oct. 1983); pp. 225–229.

Morgan et al.; *Radioisotope Themal Photovoltaic Application of the GaSb Solar Cell*; Proceedings of NASA Sprat Conference (1989); pp. 349–358.

Day et al.; *Application of the GaSb Solar Cell in Isotope–heated Power Systems*; Confernce Record, 21st IEEE Photovoltaic Specialists Conf. (May 1990); pp. 1320–1325.

Chubb; *Reappraisal of Solid Selective Emitters*; Conference Record, 21st IEEE Photovoltaic Specialists Conf. (May 1990); pp. 1326–1333.

Fraas et al.; *status of TPV Commercial System Development Using GaSb Infrared Sensative Cells*; Presentation at Second World Photovoltaic Specialists Conference, Vienna, Austria; Jul. 6–10, 1998; Pre–print Copy: 5 pages.

Whitaker; *GaSb Shines Brighter Than The Midnight Sun*; Compound Semiconductor, Technology Update; Fall 1998; pp. 33–34.

* cited by examiner

THERMOPHOTOVOLTAIC GENERATOR IN HIGH TEMPERATURE INDUSTRIAL PROCESS

This application claims the benefit of U.S. Provisional Application No. 60/198,734 filed Apr. 21, 2000.

BACKGROUND OF THE INVENTION

JX Crystals has been developing thermophotovoltaic (TPV) generators for small-scale applications. These applications include heating stoves for off-grid cabins, outdoor battery chargers for the Army, and residential furnaces for combined heat and power.

JX Crystals TPV technology is based on three core elements: low bandgap TPV cells, high packing density shingle circuits, and antireflection (AR) coated refractory metal matched infrared (IR) emitters (patent references).

In the applications that we have described to date, hydrocarbon fuel is burned inside the emitter and the cell arrays are mounted outside the IR emitter. However, there are high temperature industrial processes where large burners heat large spaces.

In these applications, TPV could be used to produce electricity for various needs, since burners are already present, heat is being used, and heat recovery means already are designed into the process.

FIG. 1 shows an example of one such high temperature large-scale industrial process, i.e. a glass-melting furnace. A need exists to design a TPV generator for use in these high temperature industrial processes. This TPV system will need to be easily inserted into the high temperature zone without disrupting the process. It will also need to be easily accessed for maintenance. Furthermore, it will have to produce economical electric power. One benefit of such a TPV system would be that it could produce back up power in the event of a power failure so that the process could run in an idle state. Without backup power, considerable damage will be done to the furnace and its contents if the furnace cools down.

SUMMARY OF THE INVENTION

The inventive emitter for use with a generator is a tube closed at one end heated from its outside with a water-cooled photovoltaic converter array mounted inside.

In the preferred embodiment for glass-melting application, several of these TPV tubes may be inserted through holes in the insulation into the port sections between the glass-melting furnace and the regenerators. Any one of these tubes may be removed for maintenance at any time and replaced with a closure, such as but not limited to a brick, to close off the hole, without affecting the industrial process.

In a preferred embodiment, the outer emitter tube may be a SiC or KANTHAL (iron-chromium-aluminum alloy) tube. This tube may be lined on its inside preferably with AR coated tungsten foil. Alternatively, the tungsten could be deposited on the inner tube surface as a film followed by the AR coating.

The photovoltaic converter array may consist of a polygonal array of shingle circuits where the circuits are fabricated using low bandgap GaSb cells. The water-cooled photovoltaic converter array may be mounted on a base plate and this base plate may be clamped to a flange on the SIC or KANTHAL tube. A metal o-ring seals the base plate to the tube flange so that the inner space between the photovoltaic array and the AR coated tungsten emitter can be back filled with an inert gas such as argon. Electrical and water cooling feeds are provided through the base plate.

This industrial TPV generator is actually simpler than small-scale TPV generators because no burners or recuperators are required in the TPV generator design. These are already provided in the industrial process. This leads to lower cost.

These and further and other objects and features of the invention are apparent in the disclosure, which includes the above and ongoing written specification, with the drawings.

DETAILED DESCRIPTION OF PREFERRED EMBODIMENTS

Figure 1:
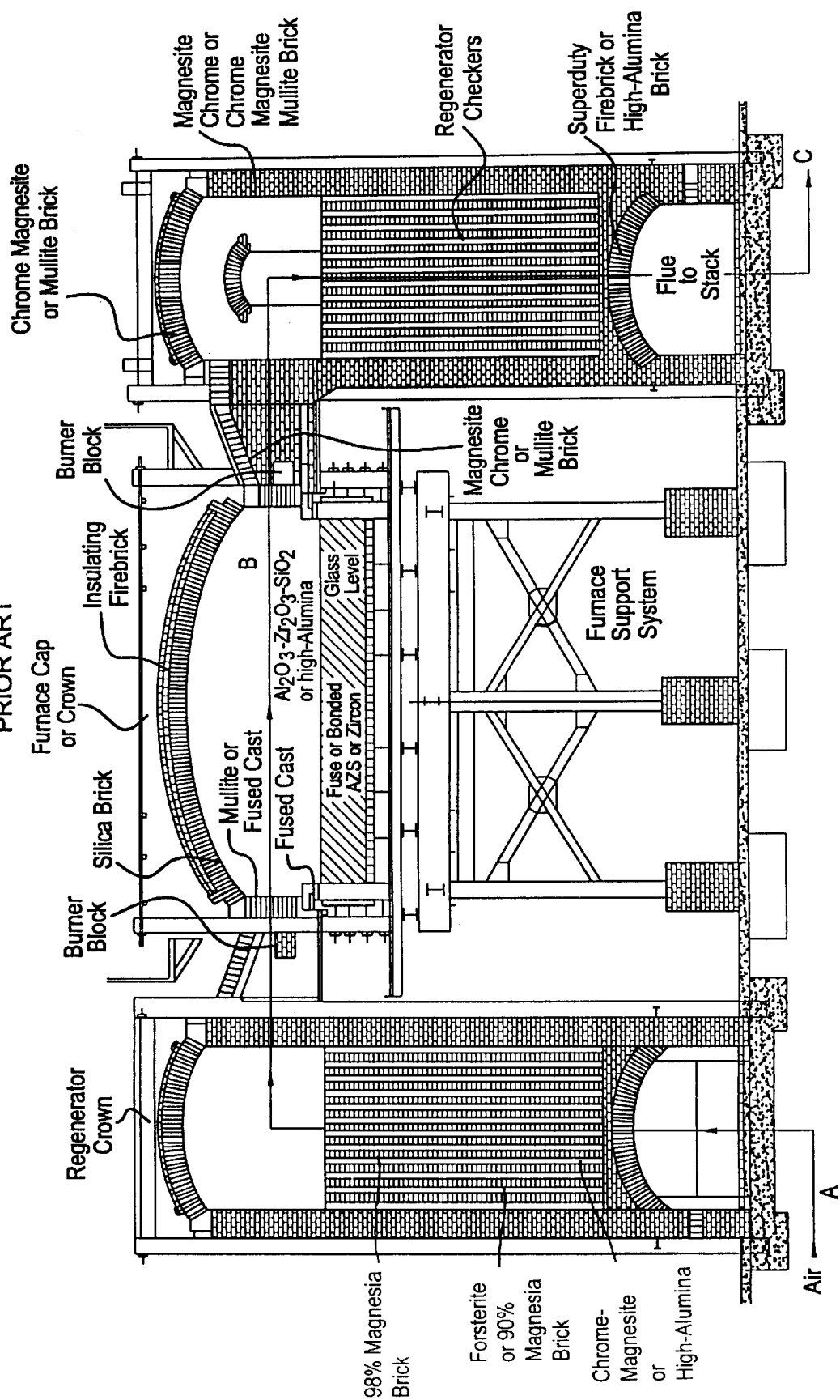
FIG. 1 shows a state-of-the-art regenerative glass melting furnace.

FIG. 1 shows a cross-section of a typical regenerative sideport glass tank melting furnace. Gas and heated air enter from the side of the rectangular shaped furnace A. Raw materials are injected into one end, air is drawn into the regenerator sections along side the tank, and with ignited gas, enters the furnace through the burner blocks. The flame goes into the furnace across the top of the glass batch B. Exhaust gases are withdrawn via the port through the regenerator C and out the chimney flue. After about 15–20 minutes of this cycle, the direction of the gas and air is renewed in the opposite direction. The cycle continues to repeat itself, and the alternating burning cycles keep the air mixture heated, allowing more efficient use of the gas in the furnace.

Figure 2:
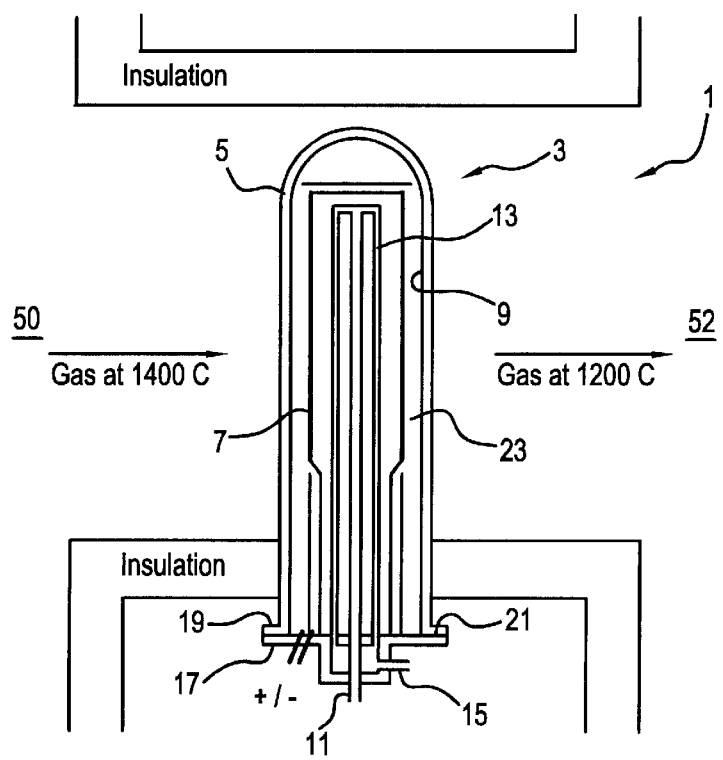
FIG. 2 shows the inventive TPV generator for the regenerative glass-melting furnace of FIG. 1.

FIG. 2 shows the inventive TPV generator 1 designed for use in the regenerative glass-melting furnace shown in FIG. 1. The emitter 3 is a tube 5 closed at one end heated from its outside with a water-cooled photovoltaic converter array 7 mounted inside.

In the glass-melting application, several of these TPV tubes may be inserted through holes in the insulation 27 into the port sections between the glass-melting furnace 50 and the regenerators 52. Any one of these tubes 5 could be removed for maintenance at any time and replaced with a closure, such as but not limited to a brick, to close off the hole.

In a preferred embodiment, the outer emitter tube 5 may be a SiC or Kanthal tube. This tube may be lined on its inside with AR coated tungsten foil 9. Alternatively, the tungsten could be deposited on the inner tube surface as a film followed by the AR coating. Water cooling may be effected by flowing water through inlet 11, pipes 13, and outlet 15.

A photovoltaic converter array 7 may, for example, consist of a polygonal array of shingle circuits where the circuits are fabricated using low bandgap GaSb cells.

The water-cooled photovoltaic converter array 7 may be mounted on a base plate 17 and this base plate may be clamped to a flange 19 on the SIC or KANTHAL tube. A metal o-ring 21 seals the base plate 17 to the tube flange 19 so that the inner space 23 between the photovoltaic array and the AR coated tungsten emitter can be back filled with an inert gas such as argon. Electrical and water cooling feeds are provided through the base plate.

Figure 3:
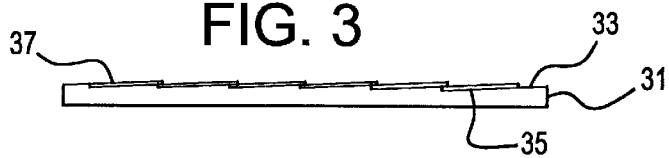
FIG. 3 is a side view of a shingle circuit.
Figure 4:
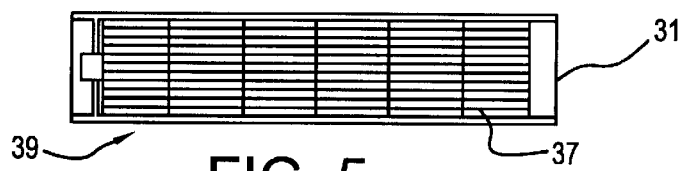
FIG. 4 is a top view of the shingle circuit.
Figure 5:
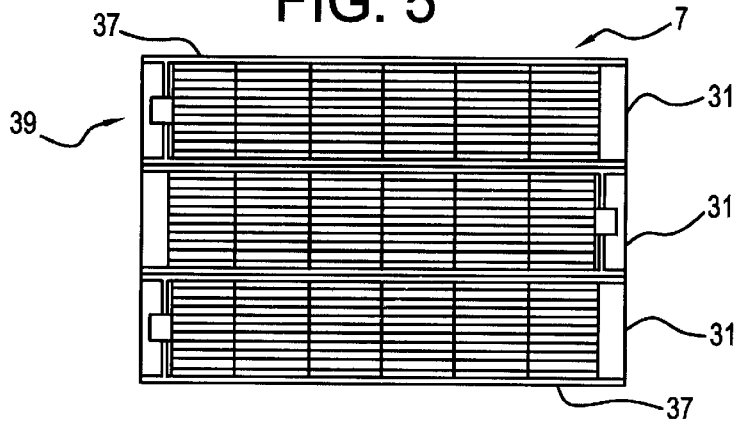
FIG. 5 is a top view of a shingle array.

FIGS. 3–5 show a preferred embodiment of the TPV shingle circuit. This concept utilizes a terraced metal substrate 31, which may be of, but is not limited to, AlSiC or enameled cast-iron material. An insulating film 33 may be deposited over the terraces and copper pads 35 may be deposited on the terrace top faces. GaSb TPV cells 37 are then bonded to the copper pads and connected in series in a shingle pattern. FIG. 4 is a top view of a single shingle circuit 39. FIG. 5 shows a top view of a shingle circuit array 7.

This industrial TPV generator is actually simpler than small-scale TPV generators because no burners or recuperators are required in the TPV generator design. These are already provided in the industrial process. This leads to lower cost.

Furthermore, the TPV converter here is more efficient. In the small-scale applications, we need to include the burner and recuperator efficiencies in our overall efficiency calculation. However in the preferred industrial application, the TPV conversion efficiency is simply the emitter spectral efficiency, about 75%, times the cell conversion efficiency of about 30%, which works out to about 22.5%. The burned and the recuperator efficiencies are relevant to the already existing industrial thermal process.

While the invention has been described with reference to specific embodiments, modifications and variations of the invention may be constructed without departing from the scope of the invention.

I claim:

1. An electric generator apparatus for mounting in hot gas streams comprising a tube closed at one end and heated from an outside by hot gas from the hot gas streams, a photovoltaic array in the tube, an infrared emitter lining on an inner surface of the tube, the photovoltaic array facing the infrared emitter for receiving infrared energy and converting a portion of the infrared energy to electric energy.

2. The apparatus of claim 1, wherein the tube is a SiC tube.

3. The apparatus of claim 1, wherein the tube is an iron-chromium-aluminum alloy tube.

4. The apparatus of claim 1, wherein the lining is of antireflection coated tungsten foil.

5. The apparatus of claim 1, wherein the tube has an inner coating of tungsten film.

6. The apparatus of claim 5, further comprising an antireflection coating on the tungsten film.

7. The apparatus of claim 1, wherein the photovoltaic array includes a cooling system.

8. The apparatus of claim 1, wherein the photovoltaic array comprises a polygonal array of shingle circuits.

9. The apparatus of claim 8, wherein the shingle circuits are fabricated of low bandgap GaSb cells.

10. The apparatus of claim 7, wherein the cooling system comprises inlets for receiving cooling fluids, outlets, and pipes connecting the inlets and the outlets for circulating the cooling fluids and for cooling the generator.

11. The apparatus of claim 7, wherein the cooling system is a water cooling system.

12. The apparatus of claim 7, further comprising a flange on the tube and a base plate attached to the flange.

13. The apparatus of claim 12, wherein the photovoltaic array and the cooling system are mounted on the base plate.

14. The apparatus of claim 12, further comprising metal o-ring seals for sealing the base plate to the flange.

15. The apparatus of claim 14, further comprising inner spaces between the photovoltaic array and the emitter, wherein the inner spaces are back filled with an inert gas.

16. The apparatus of claim 15, further comprising electrical and water cooling feeds provided through the base plate.

17. The apparatus of claim 16, further comprising insulation for insulating the generator.

18. Generator apparatus for high temperature industrial processes comprising at least one TPV generator having an emitter and a photovoltaic converter, the at least one TPV generator being adapted for mounting in a path of hot gases circulating in the high temperature industrial processes.

19. The apparatus of claim 18, wherein the emitter comprises at least one tube, the tube being closed at one end.

20. The apparatus of claim 19, wherein the at least one tube is a SiC tube.

21. The apparatus of claim 19, wherein the at least one tube is an iron-chromium-aluminum alloy tube.

22. The apparatus of claim 19, wherein the tube has an inner lining of antireflection coated tungsten foil.

23. The apparatus of claim 19, wherein the tube has an inner coating of tungsten film.

24. The apparatus of claim 23, further comprising an antireflection coating on the tungsten film.

25. The apparatus of claim 19, wherein the photovoltaic converter is a photovoltaic array mounted in the at least one tube and wherein the at least one tube is heated by the hot gases from the industrial processes.

26. The apparatus of claim 25, wherein the photovoltaic array includes a cooling system.

27. The apparatus of claim 25, wherein the photovoltaic array comprises a polygonal array of shingle circuits.

28. The apparatus of claim 27, wherein the shingle circuits are fabricated of low bandgap GaSb cells.

29. The apparatus of claim 26, wherein the cooling system comprises inlets for receiving cooling fluids, outlets, and pipes connecting the inlets and the outlets for circulating the cooling fluids and for cooling the TPV generator.

30. The apparatus of claim 29, further comprising a flange on the tube, a base plate attached to the flange, wherein the photovoltaic converter array and the cooling system are mounted on the base plate.

31. The apparatus of claim 30, further comprising metal o-ring seals for sealing the base plate to the flange.

32. The apparatus of claim 31, further comprising inner spaces between the photovoltaic array and the emitter, wherein the inner spaces are back filled with an inert gas.

33. The apparatus of claim 32, further comprising electrical and water cooling feeds provided through the base plate.

34. The apparatus of claim 33, further comprising insulation for insulating the TPV generator.

35. The apparatus of claim 18, further comprising a furnace, wherein the furnace is a regenerative glass tank melting furnace, and wherein the TPV generator is mounted between a furnace and a regenerator of the regenerative furnace.

36. The apparatus of claim 35, wherein the furnace comprises a side-port for entry of gas and heated air, an injection port for raw materials, and an air intake for drawing air and ignited gas into the regenerator through burner blocks.

37. The apparatus of claim 36, further comprising an exhaust for withdrawing exhaust gases via the regenerator to a chimney flue.

38. The apparatus of claim 37, wherein a direction of flow of the air and gases is periodically renewed in opposite directions for alternating burning cycles and for keeping air-gas mixture and the emitter heated.

39. The apparatus of claim 19, wherein the at least one tube comprises plural tubes provided in a regenerative furnace.

40. The apparatus of claim 39, further comprising a regenerator and insulation in the furnace, wherein the tubes are provided through openings in the insulation.

41. The apparatus of claim 40, further comprising port sections between the furnace and the regenerator, wherein the tubes are provided in the port sections.

42. The apparatus of claim 40, wherein each tube is removable independent of adjacent tubes.

43. The apparatus of claim 42, further comprising a closure for closing an opening in the insulation after removal of a tube.

44. The apparatus of claim 18, wherein the photovoltaic converter comprises a TPV shingle circuit.

45. The apparatus of claim 44, wherein the shingle circuit comprises a terraced metal substrate.

46. The apparatus of claim 45, wherein the substrate is of AlSiC material.

47. The apparatus of claim 45, wherein the substrate is of enameled cast-iron material.

48. The apparatus of claim 45, further comprising an insulating film over terraces of the substrate.

49. The apparatus of claim 48, further comprising copper pads deposited on top faces of the terraces.

50. The apparatus of claim 49, further comprising GaSb TPV cells bonded to the copper pads and connected in series in a shingle pattern.

51. Thermophotovoltaic generator for regenerative side-port glass tank melting furnaces comprising a shaped furnace and regenerator, ports for supplying gas and heated air to the shaped furnace, injection ports for injecting raw materials, intake for drawing air into the regenerator along with ignited gas through burner blocks, exhaust gases withdrawn via the ports through the regenerator and exhausted via chimney flues, at least one TPV generator having an emitter and a photovoltaic converter, the at least one TPV generator being mounted between the shaped furnace and the regenerator.

52. The apparatus of claim 51, wherein the emitter comprises at least one tube, the tube being closed at one end.

53. The apparatus of claim 52, wherein the at least one tube is a SiC or an iron-chromium-aluminum alloy tube.

54. The apparatus of claim 53, wherein the tube has an inner lining of antireflection coated tungsteen foil.

55. The apparatus of claim 53, wherein the tube has an inner coating of tungsten film.

56. The apparatus of claim 55, further comprising an antireflection coating on the tungsten film.

57. The apparatus of claim 52, wherein the photovoltaic converter is a photovoltaic converter array mounted in the at least one tube and wherein the at least one tube is heated with the photovoltaic converter array.

58. The apparatus of claim 57, wherein the photovoltaic converter array includes a water-cooling system.

59. The apparatus of claim 57, wherein the array comprises a polygonal array of shingle circuits.

60. The apparatus of claim 59, wherein the shingle circuits are fabricated of low bandgap GaSb cells.

* * * * *